United States Patent [19]

Ferm

[11] 4,394,213
[45] Jul. 19, 1983

[54] HYDROXY-ALUMINUM/LIGNIN SULFONATE COMPOSITIONS

[75] Inventor: Richard L. Ferm, Lafayette, Calif.

[73] Assignee: Chevron Research Company, San Francisco, Calif.

[21] Appl. No.: 279,299

[22] Filed: Jul. 1, 1981

[51] Int. Cl.³ .............................................. D21H 3/18
[52] U.S. Cl. .................................... 162/163; 106/900; 106/123 LC; 71/903; 162/181.5; 405/263; 405/264
[58] Field of Search ............. 71/903, 23; 106/123 LC, 106/123 R, 900; 162/163, 181.5; 405/263, 264

[56] References Cited

U.S. PATENT DOCUMENTS 4,191,610  3/1980  Prior .................................... 162/163

FOREIGN PATENT DOCUMENTS

| 45-49 | 1/1970 | Japan | 423/556 |
| 51-82914 | 7/1976 | Japan | 405/263 |
| 1357603 | 6/1974 | United Kingdom | 405/263 |
| 1569560 | 6/1980 | United Kingdom | 405/263 |

Primary Examiner—William F. Smith
Attorney, Agent, or Firm—D. A. Newell; J. M. Whitney; O. T. Dickinson

[57] ABSTRACT

A composition comprising salts of lignin sulfonate and hydroxy-aluminum and water. The composition stabilizes soil formations from the effects of water and increases the water resistance of paper products.

15 Claims, No Drawings

HYDROXY-ALUMINUM/LIGNIN SULFONATE COMPOSITIONS

BACKGROUND OF THE INVENTION

This invention relates to a composition and method of treating water sensitive materials, such as soil formations, paper products, and the like.

Soil stability is a problem of major concern in construction, road building, and well boring operations, such as oil and water wells. Soil conditions, such as clay soils and sandy soils tend to be unstable when in contact with water. In petroleum-producing operations, the oil-bearing strata can undergo permeability losses which obstruct the flow of petroleum to a producing well when in contact with water from water injection wells or water from adjacent strata which leach into the petroleum-producing strata. Thief zones can divert valuable injection solutions to strata other than the producing zone. Unpaved roadways have a tendency to degenerate into muddy boggs after showers. In many countries, claylike bricks, called "Adobe", are used for building. The bricks lose structural integrity and strength when exposed to water.

Aqueous hydroxy-aluminum solutions have been used to maintain oil permeability in petroleum-bearing strata exposed to water and/or plug thief zones. The aqueous hydroxy-aluminum solutions have also been used for surface soil stabilization. Although treated soil is an improvement over untreated soil, the structural integrity of the soil is reduced upon exposure to flood-like conditions or complete immersion in water.

Calcium lignin sulfonate has also been used to impart water resistance to soil formations and paper products, such as corregated cardboard. However, the water resistance disappears upon exposure to flood-like conditions or immersion in water.

Other solutions to the problem of water damage, such as paving roadways or cementing water-bearing strata in petroleum wells, may be impractical in remote areas or excessively costly. Thus, it would be highly desirable to have alternative compositions and effective methods of imparting soil stabilization or water resistance to paper products. It would be also desirable to have compositions and methods of treatment which are superior to those presently known in the art.

SUMMARY OF THE INVENTION

Soil formations can be stabilized through a process of treating the formation with a composition comprising water and a solute which comprises a mixture of the salts of lignin sulfonate and hydroxy-aluminum. The composition can also be used to size paper and improve the water resistance of the treated paper product.

DETAILED DESCRIPTION OF THE INVENTION

The composition useful for treating soil formations and sizing paper comprises about 30% by weight to about 95% by weight water and from about 70% by weight to about 5% by weight of a solute wherein the solute comprises a mixture of a lignin sulfonate salt and a hydroxy-aluminum salt in a weight ratio of lignin sulfonate to hydroxy-aluminum of from about 1:4 to about 4:1, and preferably from about 1:2 to about 2:1. Of course less water is needed if the soil has a high moisture content.

The lignin sulfonate salt can be any commercially available salt of lignin sulfonate. Suitable examples are ammonium lignin sulfonate, sodium lignin sulfonate, calcium lignin sulfonate, mixtures thereof, and the like.

The hydroxy-aluminum salt can also be any commercially available salt in solution or dry such as Chlorhydrol, 50% w/w solution sold by the Reheis Chemical Company. The solution can be prepared from the mixture of a salt solution of hydroxy-aluminum and the addition of a base, such as sodium hydroxide. British Pat. No. 509,815 and U.S. Pat. No. 2,492,085 teach methods of preparing hydroxy-aluminum. Suitable hydroxy-aluminum salts are hydroxy-aluminum chloride, hydroxy-aluminum nitrate, hydroxy-aluminum sulfate, hydroxy-aluminum acetate, mixtures of said salts, and the like. Salts of hydroxy-aluminum and the term "aluminum hydroxide salts" are used as interchangeable synonyms herein. Examples of suitable aluminum hydroxide nitrates are $Al(OH)(NO_3)_2$, $Al_2(OH)_2NO_3$, $Al_2(OH)_2(NO_3)_2$, $Al_2(OH)_5NO_3$, $Al_3(OH)_8NO_3$, $Al_4(OH)_9NO_3$, and $Al_4(OH)_9(NO_3)_3$.

The exact composition of hydroxy-aluminum is unknown. However, depending upon the concentration of hydroxy ions and aluminum ions in the composition, the composition contains hydroxy-aluminum in various stages of polymerization, such as $[Al(OH)]^{+2}$, $[Al(OH)_2]^{+1}$, $[Al_4(OH)_8]^{+4}$, $[Al_{10}(OH)_{22}]^{+8}$, $[Al_{54}(OH)_{144}]^{+18}$ and the like. H. Frenkel, Soil Sci. Soc. An. J., Vol. 44, pp. 626–629 (1980), and Bersillon et al, Soil Sci. Soc. An. J., Vol. 44, pp. 630–634, (1980), both of said papers incorporated herein by reference, have attempted to categorized hydroxy-aluminum solutions. The solutions can be basically categorized into monomeric ion solutions, and low through high molecular weight polymeric solutions. A general formula to cover the hydroxy-aluminum portion of the composition is $Al(OH)_nX_{3-n}$ where n is from about 1.5 to 2.7 and preferably 2.1 to 2.7 and X is an anion such as $Cl^-$, $Br^-$, $NO_3^-$, $CH_3COO^-$, $SO_4^=$ and the like.

Although the hydroxy-aluminum solution may be difficult to categorize, I have discovered that solutions of salts of hydroxy-aluminum salts of lignin sulfonate, stabilize soil compositions and impart superior soil stabilization to either of the two salts used alone.

If the composition is too thick, a mineral acid, such as hydrochloric acid, nitric acid, sulfuric acid, mixtures thereof, and the like, can be used to thin the solution. The composition may comprise a mineral acid in an amount up to about 15% by weight based on the total solids content of the solute used in the composition.

The composition can be used as a soil stabilizer for roadways, foundations, and the like, by mixing the composition in an amount of from about 5% by weight to about 25% by weight of the soil treated. If the composition is used to enhance the water resistance of sand or clay-like soils as used in "Adobe", the Adobe soil will comprise of from about 75% by weight to about 95% by weight soil and from about 25% by weight to about 5% by weight hydroxy-aluminum composition. Air-dried treated soils remain unchanged after exposure to 24 hours of soaking in water. By comparison, soil mixed with either salts of lignin sulfonate or hydroxy-aluminum alone disintegrate within a short time after immersion into water.

Other soils, such as a high clay content Hans Sumpf soil, can be stabilized with the composition. Hans Sumpf soil has a grain size such that 100% of the soil will pass through a screen sieve #8 with at least 46% passing through a screen sieve #200. Soil with a particle size of less than about 2.36 mm will pass through an 8 screen sieve size. Soil with a particle size less than about 0.075 mm will pass through a 200 screen sieve size. The sieve numbers are U.S. standard sieve series screens.

To prevent wind erosion and water erosion, as well as dusty conditions, surface soil can be sprayed with the composition at the rate of about 0.1 to about 2 gallons per square yard of soil. The concentration used in the downhole stabilization of petroleum-bearing and adjacent strata is from about 0.5 gallons to about 20 gallons per cubic yard of formation strata.

The composition is prepared by mixing water, a salt of lignin sulfonate, such as a commercially available product of calcium lignin sulfonate available from Georgia Pacific Company and a salt of hydroxy-aluminum, such as Chlorhydrol, a product of the Reheis Chemical Company in the appropriate proportions. The composition can be thinned by mixing with a mineral acid. Preferably, the solution has a monovalent base to aluminum ratio in the range of from about 1.5:1 to about 2.7:1 base to aluminum. Preferably the ratio is from 2.1 to 2.7. The lower the ratio, the more acidic the solution. Higher ratios, i.e. more basic solutions, are preferred when the composition is used with carbonate-containing rocks. More specifically, the hydroxy-aluminum solution is mixed to provide a composition which can be thickened with the addition of additional base or thinned by the addition of a mineral acid.

The composition is mixed in the appropriate weight ratios to stabilize soil. In addition, the composition is injected downhole in a well at sufficient pressure to permeate the thief zones. Sufficient quantities are used to prevent loss of injection materials into thief zones or water seepage from adjacent strata into the oil-producing zones. The composition can also be used in the producing zone to stabilize a formation with water sensitive clays. After treatment and a suitable shut-in period, the well is put back into production.

In paper sizing applications, the paper is immersed in the composition for a sufficient time to thoroughly soak and penetrate the paper and thereafter the paper is permitted to dry. The composition imparts a brown or tan color to the paper upon drying. The treated paper remains strong although flexible after immersion in water for 24 hours. By comparison, untreated paper disintegrates after soaking in water for only a few minutes. The treated paper also chars when exposed to flames but does not support combustion. This illustrates the invention use as a fire retardent.

The following examples illustrate the invention. Modifications which would be obvious to one of ordinary skill in the art are contemplated to be within the scope of the invention.

EXAMPLES

Example 1

61.0 Grams of a calcium lignin sulfonate solution, a product of the Georgia Pacific Production Company, was weighed into a beaker. The solution was 50% calcium lignin sulfonate. 5.9 grams of 35% concentrated hydrochloric acid and 27.0 grams of Chlorhydrol, a hydroxy-aluminum solution, a product of the Reheis Chemical Company, was added to and mixed with the lignin sulfonate. The Chlorhydrol was 50% hydroxy-aluminum, i.e. a 6.2 molar solution of hydroxy-aluminum. A thick grease-like gel was obtained. 7.2 Grams of 35% concentrated hydrochloric acid was mixed with the gel until it broke into a dark uniform liquid. 50 ml of this mixture was added to about 50 ml of water to give a smooth, uniform, brownish milk-like emulsion. About 20 grams of the composition was mixed with Hans Sumpf soil. The mixture was poured in a panlid and set aside to dry. The soil had a moderate clay content of about 20%. The treated soil contained about 14% of the final composition. The dry treated soil was immersed in a beaker of water. The soil did not lose its structural integrity and remained unchanged and hard after 24 hours soaking in the water.

Comparative Example A

A composition was made comprising 50% by weight calcium lignin sulfonate solution, a product of the Georgia Pacific Company, and 50% by weight water. The calcium lignin sulfonate solution was 50% active calcium lignin sulfonate and 50% water. Therefore, the final solution was 25% active calcium lignin sulfonate and 75% water. 5 grams of the water lignin sulfonate mixture was thoroughly mixed with 30 grams of Hans Sumpf soil disclosed in Example A. The mixture was set aside to dry. Upon drying at room temperature, the soil mixture was immersed in a beaker of water. Upon immersion, the treated soil immediately began to disintegrate.

Comparative Example B

60 Grams of Hans Sumpf soil, similar to the soil used in Example 1, was mixed with 10 grams of 6.2 molar solution hydroxy-aluminum and permitted to dry at room temperature. The air-dried sample was placed in a beaker of water. Shortly after immersion, the treated soil started to disintegrate and fall apart.

Comparative Example C

A composition in accordance with the composition outlined in Example 1 was fabricated. However, aluminum sulfate was substituted for the hydroxy-aluminum. 50 ml of the composition was mixed with 50 ml of water and then 10 ml of the mixture was mixed with 82.5 grams of Hans Sumpf soil to give a stiff mud which was permitted to dry at room temperature. The stabilized soil was immersed in water. Immediately after immersion, the treated soil began to fall apart into small particles. After a few minutes, a thin layer of mud was deposited on the bottom of the beaker.

The rate of disintegration was not as rapid as that for calcium lignin sulfonate alone, or hydroxy-aluminum stabilized soils alone.

This illustrates that a composition of salts of hydroxy-aluminum/lignin sulfonate is superior to the above compositions alone.

Example 2A

Hans Sumpf soil was treated with the composition in accordance with Example 1 and permitted to dry. The treated soil was immersed in a beaker of Chevron 350H thinner, a hydrocarbon product boiling in the range of from about 314° F. about 400° F. After 24 hours the treated soil had not disintegrated and the solvent remained clear.

Example 2B

The thinner was then drained off and the beaker was filled with diesel fuel. The treated soil was soaked in the diesel fuel for twenty-four hours without any signs of disintegration. This demonstrates the resistance of the treated soil to hydrocarbons, such as diesel fuels and thinners, and makes it useful for embankment materials to contain hydrocarbons.

Example 3

A section about 4 inches by 4 inches of unsized blotter paper was immersed in the composition fabricated in Example 1. The treated paper was hung up to dry in air at room temperature. Upon drying, the blotter paper was hard and stiff and had a brown tan in color. The treated paper was immersed in water for one-half hour. The treated paper was much stronger than untreated paper but not water-proofed. A very small amount of color leached into the water. Thereafter, the dried treated paper was subjected to a flame. The treated paper charred, but it did not support combustion indicating that composition has fire retardent properties.

Example 4

A piece of blotter paper 4 inches by 4 inches was treated with the composition of Example 1 and then dried. The treated paper was soaked in water for 24 hours. The paper remained stiff and did not disintegrate. The treated paper had good wet strength. Untreated paper disintegrated.

I claim:

1. A composition comprising about 30% by weight to about 95% by weight water and about 70% by weight to about 5% by weight of a solute, said solute comprising a mixture of a lignin sulfonate salt and a polymeric hydroxy-aluminum salt in a weight ratio of lignin sulfonate to hydroxy-aluminum of from about 1:4 to about 4:1.

2. The composition according to claim 1 wherein the hydroxy-aluminum salt is selected from the group consisting of hydroxy-aluminum chloride, hydroxy-aluminum nitrate, hydroxy-aluminum sulfate, hydroxy-aluminum acetate, and mixtures thereof.

3. The composition according to claim 2 wherein the lignin sulfonate salt is selected from the group consisting of ammonium lignin sulfonate, sodium lignin sulfonate, calcium lignin sulfonate, and mixtures thereof.

4. The composition according to claim 3 wherein the hydroxy-aluminum has the formula $Al(OH)_n X_{3-n}$ where n is from 1.5 to 2.7 and X is the anion of the hydroxy-aluminum salt.

5. The composition according to claim 4 wherein the ratio of lignin sulfonate:hydroxy-aluminum is from about 1:2 to about 2:1.

6. The composition according to claim 1 or 5 wherein the composition further comprises up to about 15% by weight based on the total solids content of the solute of a mineral acid.

7. The composition according to claim 6 wherein the mineral acid is selected from the group consisting of hydrochloric acid, nitric acid, sulfuric acid, and mixtures thereof.

8. The composition according to claim 6 wherein said composition further comprises soil in an amount of from about 75% by weight to about 95% by weight of the mixture of said composition.

9. A soil stabilized with the composition according to claim 6.

10. A method of increasing the water resistance of paper which comprises treating the paper with the composition according to claim 6 for a sufficient time to impart water resistance thereto.

11. A method of stabilizing soil surfaces apt to be rewet comprising:
applying a soil stabilizing composition to the soil in an amount of from about 10 to about 25% by weight of the treated soil, said stabilizing composition comprising about 30% to about 95% by weight water and about 70% by weight to about 5% by weight of a solute wherein said solute comprises salts of lignin sulfonate and polymeric hydroxy-aluminum in a ratio of lignin sulfonate to hydroxy-aluminum of from about 1:4 to 4:1.

12. The method according to claim 11 wherein the soil stabilizing composition further comprises a mineral acid in an amount up to about 15% by weight based on the total solids content of the stabilizing composition.

13. The method according to claim 11 or 12 wherein said stabilizing composition is applied at a rate of about 0.1 to about 2 gallons of composition per square yard of soil.

14. A method of stabilizing a formation penetrated by a well comprising:
injecting a stabilizing composition down said well and into said formation, said composition comprising about 30% by weight to about 95% by weight water and about 70% by weight to 5% by weight of a solute wherein the solute comprises salts of lignin sulfonate and polymeric hydroxy-aluminum in a weight ratio of lignin sulfonate to hydroxy-aluminum of from about 1:4 to 4:1.

15. The method according to claim 14 wherein said composition is injected in an amount of about 0.5 to about 20 gallons per cubic yard of formation.

* * * * *